US012572377B2

(12) United States Patent
Tsirkin

(10) Patent No.: US 12,572,377 B2
(45) Date of Patent: Mar. 10, 2026

(54) TRANSMITTING INTERRUPTS FROM A VIRTUAL MACHINE (VM) TO A DESTINATION PROCESSING UNIT WITHOUT TRIGGERING A VM EXIT

(71) Applicant: RED HAT, INC., Raleigh, NC (US)

(72) Inventor: Michael Tsirkin, Yokneam (IL)

(73) Assignee: Red Hat, Inc., Raleigh, NC (US)

( * ) Notice: Subject to any disclaimer, the term of this patent is extended or adjusted under 35 U.S.C. 154(b) by 719 days.

(21) Appl. No.: 17/943,437

(22) Filed: Sep. 13, 2022

(65) Prior Publication Data

US 2024/0086219 A1 Mar. 14, 2024

(51) Int. Cl.
*G06F 9/455* (2018.01)
*G06F 9/48* (2006.01)

(52) U.S. Cl.
CPC ........ *G06F 9/45558* (2013.01); *G06F 9/4812* (2013.01); *G06F 2009/45575* (2013.01)

(58) Field of Classification Search
CPC .................................................. G06F 9/4812
See application file for complete search history.

(56) References Cited

U.S. PATENT DOCUMENTS

| | | | | |
|---|---|---|---|---|
| 8,453,143 | B2 * | 5/2013 | Mahalingam | ....... G06F 9/45558 |
| | | | | 718/1 |
| 8,892,802 | B2 | 11/2014 | Amit et al. | |
| 10,459,747 | B2 | 10/2019 | Tsirkin | |
| 10,853,259 | B2 | 12/2020 | Das | |
| 11,042,495 | B2 | 6/2021 | Chan et al. | |
| 2011/0197004 | A1 * | 8/2011 | Serebrin | ............. G06F 9/45558 |
| | | | | 710/267 |
| 2020/0125397 | A1 * | 4/2020 | Wu | ........................ G06F 9/4812 |
| 2020/0264917 | A1 * | 8/2020 | Kraemer | ............... G06F 9/4812 |
| 2022/0365802 | A1 * | 11/2022 | Neiger | .................... G06F 13/24 |

FOREIGN PATENT DOCUMENTS

| | | |
|---|---|---|
| CN | 102279769 B | 3/2013 |
| CN | 108073451 B | 9/2020 |

OTHER PUBLICATIONS

Chen et al. "DuVisor: a User-level Hypervisor Through Delegated Virtulization", https://arxiv.org/pdf/2201.09652.pdf, Jan. 24, 2022; pp. 1-17.

\* cited by examiner

*Primary Examiner* — Lewis A Bullock, Jr.
*Assistant Examiner* — John Robert Dakita Ewald
(74) *Attorney, Agent, or Firm* — Kilpatrick Townsend & Stockton LLP

(57) ABSTRACT

One example described herein includes a source processing unit that can detect that guest software of a virtual machine has transmitted an interrupt to a virtual central processing unit (vCPU) identifier, where the vCPU identifier that does not match any vCPUs in the virtual machine. Based on the interrupt, the source processing unit can access an interrupt table that is associated with the virtual machine. The interrupt table can include an entry that maps the interrupt to a destination processing unit. Based on the entry in the interrupt table, the source processing unit can determine that the interrupt is to be transmitted to the destination processing unit. The source processing unit can then transmit the interrupt to the destination processing unit, without triggering an exit of the virtual machine on the source processing unit.

20 Claims, 6 Drawing Sheets

602
Detect that guest software of a virtual machine has transmitted an interrupt to a vCPU identifier that does not match any vCPUs in a virtual machine

604
Access an interrupt table that is associated with the virtual machine, wherein the interrupt table includes an entry that maps the interrupt to a destination processing unit

606
Determine that the interrupt is to be transmitted to the destination processing unit based on the entry in the interrupt table

608
Transmit the interrupt to the destination processing unit, without triggering an exit of the virtual machine on a source processing unit

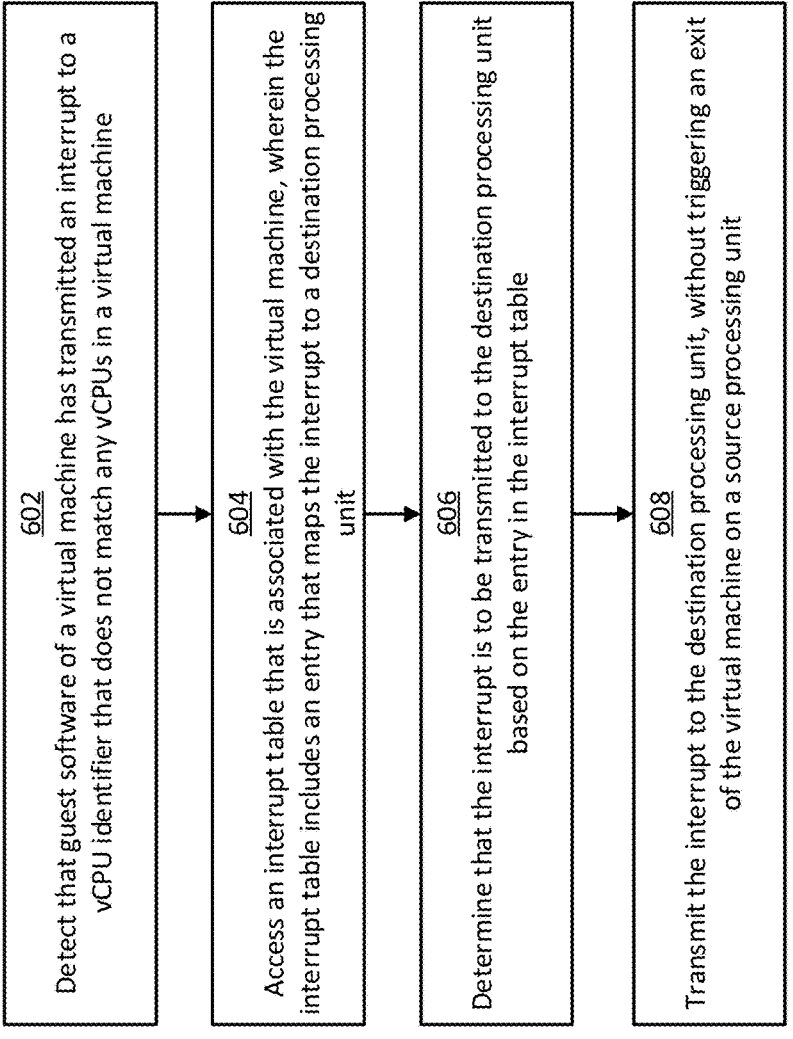

602

Detect that guest software of a virtual machine has transmitted an interrupt to a vCPU identifier that does not match any vCPUs in a virtual machine

604

Access an interrupt table that is associated with the virtual machine, wherein the interrupt table includes an entry that maps the interrupt to a destination processing unit

606

Determine that the interrupt is to be transmitted to the destination processing unit based on the entry in the interrupt table

608

Transmit the interrupt to the destination processing unit, without triggering an exit of the virtual machine on a source processing unit

FIG. 6

TRANSMITTING INTERRUPTS FROM A VIRTUAL MACHINE (VM) TO A DESTINATION PROCESSING UNIT WITHOUT TRIGGERING A VM EXIT

TECHNICAL FIELD

The present disclosure relates generally to virtual machines. More specifically, but not by way of limitation, this disclosure relates to transmitting interrupts from a virtual machine executing on a source processing unit to a destination processing unit, without triggering an exit of the virtual machine on the source processing unit.

BACKGROUND

Virtual machines are one popular mechanism for deploying virtual computing environments on a physical computer system. A virtual machine (VM) typically includes virtualized hardware and guest software. The virtualized hardware can emulate physical computer hardware. Examples of the virtualized hardware can include virtual central processing units (vCPUs), virtual random access memory (vRAM), virtual network interfaces, and virtual storage. The guest software can be any software programs that execute on top of the virtual machine. Examples of the guest software can include a guest operating system, a guest supervisory program, and one or more guest applications that may execute in userspace. Guest software is generally given limited access to the physical resources of the underlying host machine.

Virtual machines can be deployed on a host machine using a hypervisor. A hypervisor can be a software layer that sits below the virtual machines and above the physical hardware of the host machine. In some cases, the hypervisor can execute on top of an operating system running on the host machine. In other cases, the hypervisor can execute directly on the physical hardware without an operating system beneath it. Either way, the hypervisor can provide interfaces between the virtual machines and the underlying physical hardware of the host machine.

Certain events occurring in a virtual machine may result in the generation of signals referred to as interrupts. For example, an interrupt may be triggered in response to the guest software performing a sensitive operation. Examples of such sensitive operations can include the guest software attempting to execute a privileged instruction or attempting to access a certain memory address.

BRIEF DESCRIPTION OF THE DRAWINGS

FIG. 6 shows a flowchart of an example of a process for transmitting interrupts from a virtual machine to a destination processing unit without triggering a VM exit according to some aspects of the present disclosure.

DETAILED DESCRIPTION

Figure 1:
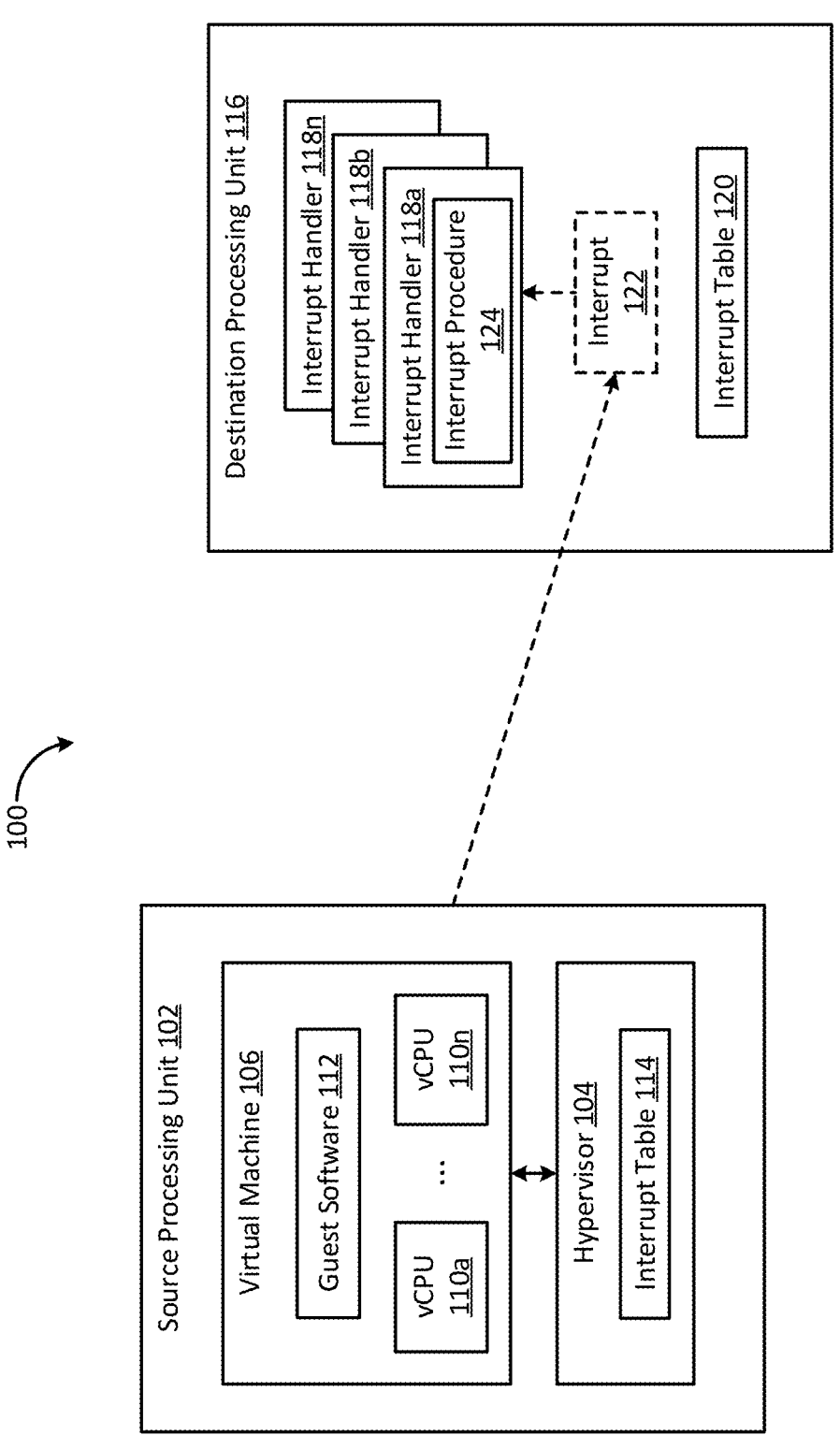
FIG. 1 shows a block diagram of an example of a system for transmitting interrupts from a virtual machine to a destination processing unit without triggering a VM exit according to some aspects of the present disclosure.

A physical computer system can include a physical processor running a hypervisor to manage a virtual machine (VM). The virtual machine can include guest software running in a guest context. The guest context can be a reduced-privilege execution mode. The guest software can execute by default in the guest context to allow the hypervisor to retain control over the physical resources of the computer system. While running, the guest software can trigger an interrupt. The interrupt may induce a transition from the guest context to another context with a higher privilege level for handling the interrupt. The transition from the guest context to the other context can be referred to as a VM exit. One example of the other context can be a hypervisor context. A hypervisor context can be a privileged execution mode in which the hypervisor performs tasks associated with the interrupt. The hypervisor context can have a higher privilege level than the guest context. In certain processor architectures, the guest context may be referred to as a virtual machine extension (VMX) non-root execution mode and the hypervisor context may be referred to as a privileged VMX root execution mode. When a VM exit causes a transition from the guest context to the hypervisor context, the hypervisor can temporarily pause the virtual machine while the interrupt is being handled. The hypervisor can then resume the virtual machine once the interrupt is complete. But, switching between execution contexts in this way can create overhead because it consumes time and computing resources. I/O intensive applications are particularly susceptible to this overhead, because they can generate a large number of interrupts that result in a large number of VM exits.

Some examples of the present disclosure can overcome one or more of the abovementioned problems by providing a source processing unit that can detect that guest software of a virtual machine has transmitted an interrupt to a virtual central processing unit (vCPU) identifier, where the vCPU identifier that does not match any vCPUs in the virtual machine. A vCPU identifier can be a unique identifier of a vCPU. The vCPU identifier in the interrupt may not "match" any of the vCPUs if the vCPU identifier is not assigned to any of the vCPUs. Based on the interrupt, the source processing unit can access an interrupt table that is associated with the virtual machine. The interrupt table can include an entry that maps the interrupt to a destination processing unit. Based on the entry in the interrupt table, the source processing unit can determine that the interrupt is to be transmitted to the destination processing unit. The source processing unit can then transmit the interrupt to the destination processing unit, without triggering an exit of the virtual machine on the source processing unit, thereby avoiding the context switching associated with a VM exit. An interrupt handler of the destination processing unit can execute an interrupt procedure corresponding to the interrupt. Using this technique, the interrupt triggered by the guest software can be injected into the destination processing unit without incurring the computing overhead associated with a VM exit.

As one particular example, the source processing unit can execute a hypervisor for managing a virtual machine. The virtual machine can include guest software that can trigger an interrupt, such as an inter-processor interrupt (IPI). An IPI can be a special type of interrupt by which one processing unit may interrupt another processing unit in a multiprocessor system to request action from the other processing unit. The interrupt may be designated for a particular virtual central processing unit (vCPU) that does not match any vCPUs of the virtual machine (e.g., the vCPU may not actually exist). For example, the guest software can transmit the interrupt to a vCPU identifier that does not match any vCPUs of the virtual machine. In response to detecting the interrupt, the source processing unit can access an interrupt table. An example of the interrupt table can be a posted interrupt descriptor (PID) table. The interrupt table may have previously been configured by the hypervisor to include an entry that maps the interrupt triggered by the guest software to a destination processing unit, where the destination processing unit is not a virtual CPU within the virtual machine. For example, the entry can map the interrupt to a pointer to the destination processing unit. The source processing unit and the destination processing unit may be physical processors, virtual processors, or any combination thereof. Based on the entry in the interrupt table, the source processing unit can determine that the interrupt is to be transmitted to the destination processing unit and perform this transmission. The destination processing unit can then receive the interrupt and responsively execute an interrupt procedure corresponding to the interrupt. In this way, the interrupt can be provided to the destination processing unit by the source processing unit without inducing a VM exit. This can reduce the overhead associated with handling the interrupt.

In some examples, the destination processing unit can also include an interrupt table that maps interrupts to interrupt handlers. The interrupt handlers can be software programs that are selectively executed by the destination processing unit to handle different types of interrupts. Using the interrupt table, the destination processing unit can determine which interrupt handler to invoke in relation to the interrupt received from the source processing unit. The destination processing unit can then invoke that interrupt handler, which in turn can perform a corresponding interrupt procedure to handle the interrupt.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for transmitting interrupts from a virtual machine 106 to a destination processing unit 116 without triggering a VM exit according to some aspects of the present disclosure. The system 100 includes a source processing unit 102, which may be a physical processor or a virtual processor. The source processing unit 102 can execute a hypervisor 104 configured to manage one or more virtual machines, such as virtual machine 106. In some examples, the hypervisor 104 can run directly on the source processing unit 102 without an operating system beneath it. In other examples, the hypervisor 104 can run on top of an operating system executing on the source processing unit 102.

The hypervisor 104 can be used to deploy a virtual machine 106. The virtual machine 106 can provide a virtu-alized computing environment that includes virtualized hardware configured to emulate corresponding physical hardware. Examples of the virtualized hardware can include one or more virtual central processing units (vCPUs) 110a-n, one or more virtual memory devices, and one or more virtual storage devices. The virtual machine 106 can execute guest software 112, which can be any suitable type of software. Examples of the guest software 112 can include a guest operating system, a guest supervisory program, or a guest application. A guest application may can execute in userspace and may have fewer privileges than a guest supervisory program or a guest operating system.

As part of the process for deploying the virtual machine 106, the hypervisor 104 can generate an interrupt table 114 corresponding to the virtual machine 106. An example of the interrupt table 114 can be a PID table. The interrupt table 114 can map interrupts triggered by the guest software 112 to destinations assigned to handle the interrupts.

Figure 2:
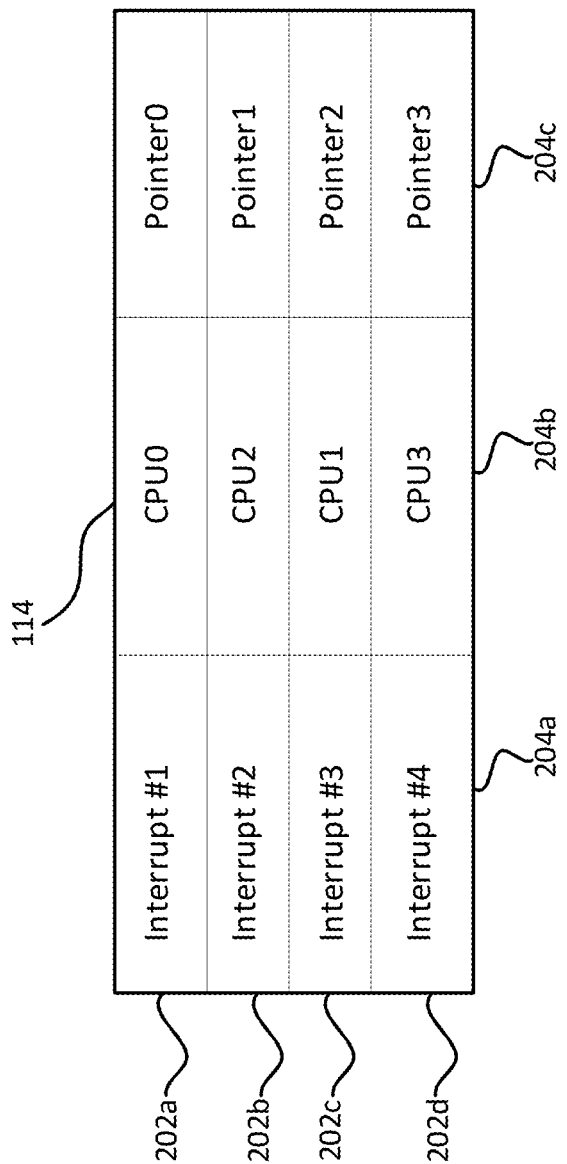
FIG. 2 shows an example of an interrupt table for a source processing unit according to some aspects of the present disclosure.

One example of the interrupt table 114 is shown in FIG. 2. As shown, the interrupt table 114 can include one or more entries 202a-d. Each entry can correlate an interrupt (shown in column 204a) to a destination processor (shown in column 204b). For example, each entry can correlate an interrupt identifier for an interrupt to a destination processor identifier for a destination processor. A destination processor can be a physical processor or a virtual processor that is designated to handle the corresponding interrupt. For example, entry 202a can specify that one type of interrupt (Interrupt #1) is designated to be handled by CPU0. Entry 202b can specify that another type of interrupt (Interrupt #2) is designated to be handled by CPU2. Entry 202c can specify that yet another type of interrupt (Interrupt #3) is designated to be handled by CPU1. And so on. Each of the destination processors may belong to the virtual machine 106 or another virtual machine. For example, CPU0 may be a vCPU 110a of the virtual machine 106, whereas CPU1 may be a vCPU of another virtual machine running on the source processing unit 102.

One or more of the entries 202a-d can also include a pointer (shown in column 204c). For example, entry 202a can map Interrupt #1 to CPU0 and Pointer0. Entry 202b can map Interrupt #2 to CPU2 and Pointer1. Entry 202c can map Interrupt #3 to CPU1 and Pointer2. And so on. Each pointer can reference a memory location, associated with the corresponding destination processor, to which interrupt data can be written. For example, Pointer0 can reference a memory location of CPU0 at which interrupt data associated with Interrupt #1 can be written. This is described in greater detail later on.

The hypervisor 104 can automatically populate the interrupt table 114 based on the virtual machines that it is managing. In some examples, the hypervisor 104 can also add an entry to the interrupt table 114 that maps an interrupt to a destination processor that does not belong to the virtual machine 106. A destination processor does not "belong" to the virtual machine 106 if the destination processor is not associated with the virtual machine 106. For instance, the destination processor may not exist within the virtual machine 106. As one specific example relating to FIG. 2, the entry 202d can map Interrupt #4 to CPU3, which can be a vCPU that does not actually exist within the virtual machine 106. In some cases, the destination processor may not exist at all within the system 100 (e.g., it may not be part of any of the virtual machines running on the source processing unit 102) and therefore may be considered a "fake" CPU. While it may normally be problematic to map an interrupt to a destination processor that does not belong to the virtual machine 106, in some examples the hypervisor 104 can also configure a pointer in the entry to correspond to the destination processing unit 116. For example, the hypervisor 104 can configure Pointer3 of entry 202*d* to reference the destination processing unit 116. As a result, the source processing unit 102 can use the pointer to determine where to route the interrupt. For example, the source processing unit 102 can use Pointer3 to determine that it is supposed to route Interrupt #4 to the destination processing unit 116.

Referring now to FIGS. 1-2 together, in some examples the guest software 112 can trigger an interrupt 122. The interrupt 122 can be of a certain type and can be designated for a particular destination processor. For example, the guest software 112 can attempt to perform a sensitive operation, which may trigger an interrupt 122. The interrupt 122 may be Interrupt #4 designated for CPU3, as shown in entry 202*d* of FIG. 2. The interrupt 1122 may be an inter-processor interrupt, in some examples. The source processing unit 102 can detect the interrupt 122 and, in response to detecting the interrupt 122, access the interrupt table 114 to determine a destination for the interrupt 122. Based on the interrupt table 114, the source processing unit 102 may first determine that the interrupt 122 is supposed to be transmitted to the destination processor. But if the destination processor does not belong to the virtual machine 106, for example in the case of CPU3, the source processing unit 102 can use the corresponding pointer (e.g., Pointer3) to determine where to forward the interrupt 122. In this way, the source processing unit 102 can determine that the interrupt 122 is to be transmitted to a destination processing unit 116, which may be a physical processor or a virtual processor. The destination processing unit 116 may or may not be part of the same physical machine (e.g., the same computing device) as the source processing unit 102. The source processing unit 102 can then transmit the interrupt 122 to the destination processing unit 116.

Figure 3:
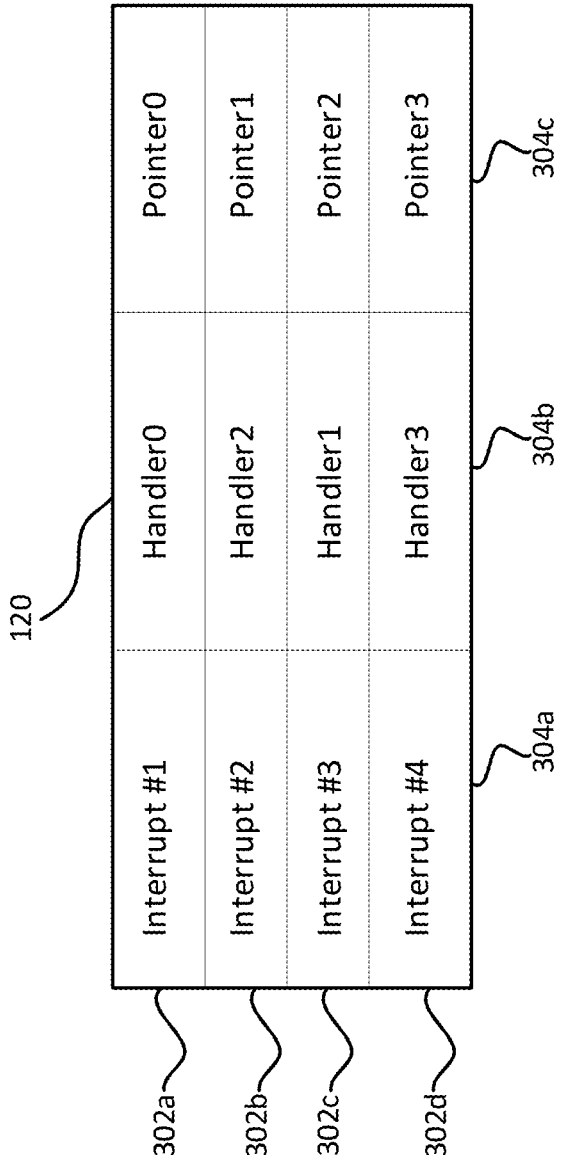
FIG. 3 shows an example of an interrupt table for a destination processing unit according to some aspects of the present disclosure.

The destination processing unit 116 can receive the interrupt 122 and access its own interrupt table 120 to determine how to handle the interrupt 122. One example of the interrupt table 120 is shown in FIG. 3. As shown, the interrupt table 120 can include one or more entries 302*a*-*d*. Each entry can correlate an interrupt (shown in column 304*a*) to a destination interrupt handler (shown in column 304*b*). For example, each entry can correlate an interrupt identifier for an interrupt to an interrupt handler identifier for a destination interrupt handler. The destination interrupt handler can be an interrupt handler that is designated to handle the corresponding interrupt. For example, entry 302*a* can specify that one type of interrupt (Interrupt #1) is designated to be handled by Handler0. Entry 302*b* can specify that another type of interrupt (Interrupt #2) is designated to be handled by Handler1. Entry 302*c* can specify that yet another type of interrupt (Interrupt #3) is designated to be handled by Handler2. And so on. In some examples, each of the entries 302*a*-*d* can also include a pointer (shown in column 304*c*). For example, entry 302*a* can map the Interrupt #1 to Handler0 and Pointer0. Entry 302*b* can map Interrupt #2 to Handler2 and Pointer1. Entry 302*c* can map Interrupt #3 to Handler1 and Pointer2. And so on. Each pointer can reference a memory location, associated with the corresponding interrupt handler, to which interrupt data can be written. For example, Pointer0 can reference a memory location at which interrupt data associated with Handler0 can be written. This is described in greater detail later on.

Continuing with FIG. 1, the destination processing unit 116 can use the interrupt table 120 to determine that the interrupt 122 is to be handled by interrupt handler 118*a*. The interrupt handler 118*a* may be part of a group of interrupt handlers 118*a*-*n* capable of being executed by the destination processing unit 116 to handle various types of interrupts. The destination processing unit 116 can then provide the interrupt 122 to the selected interrupt handler 118*a*, which can perform an interrupt procedure 124 configured to handle the interrupt 122. Examples of the interrupt procedure 124 may include accessing sensitive data stored in memory or executing a privileged instruction. The interrupt procedure 124 can be executed outside the context of the virtual machine 106. For instance, the interrupt handler 118*a* can be executed within a privileged context on the destination processing unit 116 (e.g., rather than within a guest context of the virtual machine 106).

Upon completing the interrupt procedure, the destination processing unit 116 may transmit a notification to the source processing unit 102 that the interrupt is complete. An example of the notification can include an end-of-interrupt (EOI) signal. The source processing unit 102 can receive the notification and may responsively perform one or more operations. For example, the source processing unit 102 may resume execution of the virtual machine 106, which may have previously been paused by the source processing unit 102 based on the interrupt 122, in response to receiving the notification.

Using the above techniques, the guest software 112 can trigger an interrupt procedure 124 without inducing a VM exit. This may avoid transitioning from an unprivileged guest context of the virtual machine 106 to a privileged context such as the hypervisor context, which in turn can avoid the overhead typically associated with this context switching.

In some cases, it may be desirable to return back to the default way of handling the interrupt 122 that involves a VM exit. To do so, the entry in the interrupt table 114 corresponding to the interrupt 122 can be marked as invalid. If the entry is marked as invalid, the source processing unit 102 will attempt to use the interrupt table 114 to identify the destination corresponding to the interrupt 122, determine that the corresponding entry is invalid, and trigger a VM exit so that the interrupt can be handled by the hypervisor 104. Thus, it can be relatively easy to switch the system 100 between a default operational process that involves VM exits and the improved process described herein that avoids VM exits.

Although FIG. 1 shows a certain number and arrangement of components, this is intended to be illustrative and non-limiting. Other examples may involve more components, fewer components, different components, or a different arrangement of components than is shown in FIG. 1. For instance, in another example the source processing unit 102 can be the same as the destination processing unit 116, in which case the interrupt 1122 may be considered a self-interrupt.

Figure 4:
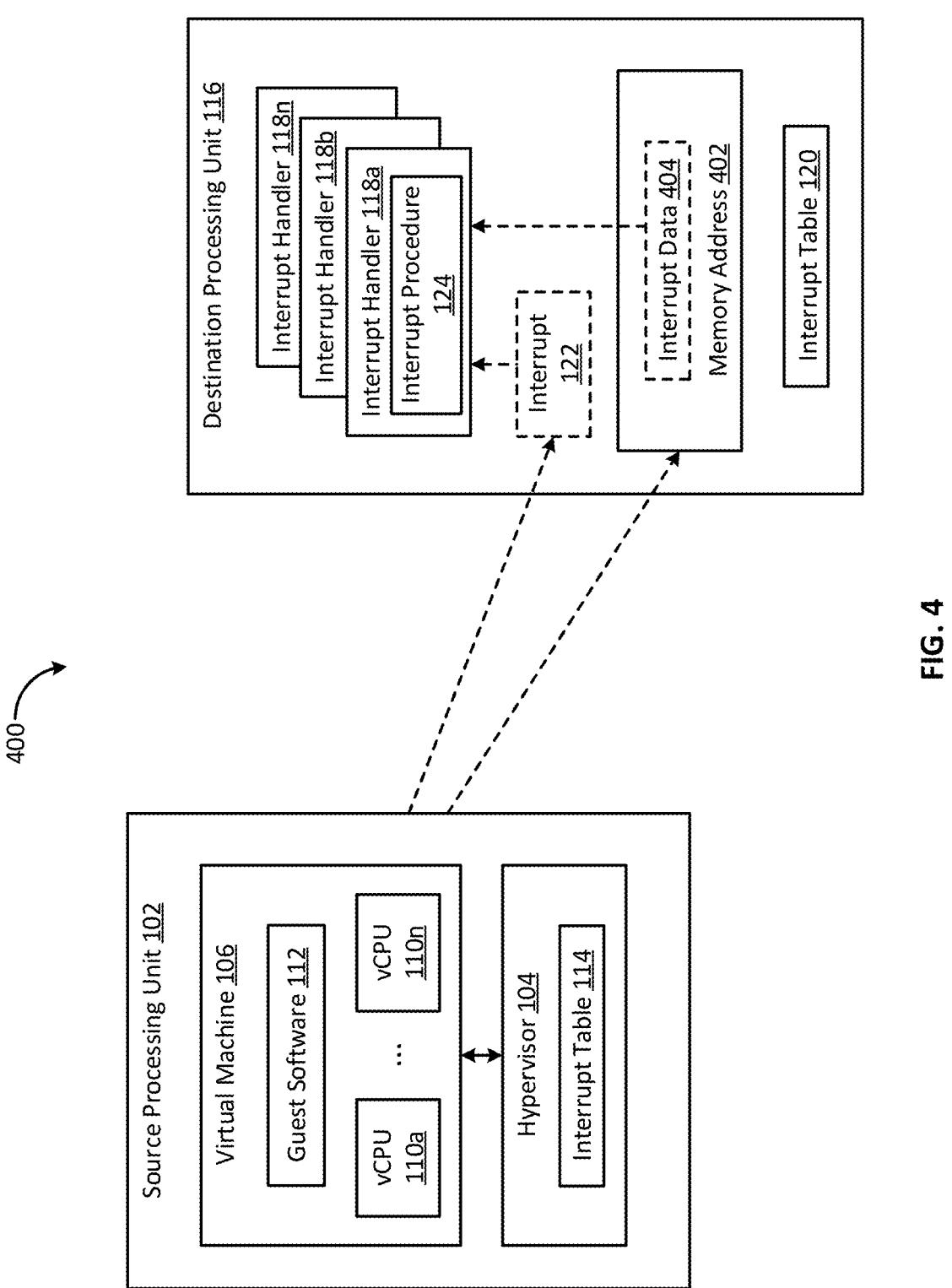
FIG. 4 shows a block diagram of another example of a system for transmitting interrupts along with additional interrupt data according to some aspects of the present disclosure.

Another example of a system 400 is shown in FIG. 4. As shown, the system 400 includes a virtual machine 106 executing guest software 112. The guest software 112 can generate an interrupt 122 in response to an event, as described above. The interrupt 122 may be of a certain type and may be designated for a particular destination processor, the combination of which may correspond to an entry in an interrupt table 114. The source processing unit 102 can detect the interrupt 122 and responsively access the entry of the interrupt table 114. In this example, the source processing unit 102 can use the entry to determine a destination for the interrupt 122 and a memory address 402 at which to store corresponding interrupt data 404. The memory address 402 may be an address located in a memory associated with the destination. For example, the source processing unit 102 can access the entry, which can correlate the interrupt 122 to a pointer. The pointer can correspond to a memory address 402 of the destination processing unit 116. Because the memory address corresponds to the destination processing unit 116, the source processing unit 102 can determine that it is supposed to transmit the interrupt 122 to the destination processing unit 116 and write the corresponding interrupt data 404 to the memory address 402.

The destination processing unit 116 can receive the interrupt 122 and, in response to receiving the interrupt 122, access its interrupt table 120. The destination processing unit 116 can access the interrupt table 120 to determine both a destination interrupt handler 118a for the interrupt 122 and the memory address 402 corresponding to the interrupt handler 118a. For example, the destination processing unit 116 can access an entry of the interrupt table 120 that correlates the interrupt 122 to both a destination interrupt handler and a pointer, where the destination interrupt handler can be the interrupt handler 118a and the pointer can correspond to the memory address 402. An example of such a pointer can be Pointer3 shown in FIG. 3. Based on the entry, the destination processing unit 116 can transmit the interrupt 122 to the interrupt handler 118a. The destination processing unit 116 can also retrieve the interrupt data 404 from the memory address 402 and provide it to the interrupt handler 118a. The interrupt handler 118a can then execute the an interrupt procedure 124 using the interrupt data 404 to handle the interrupt 122.

Figure 5:
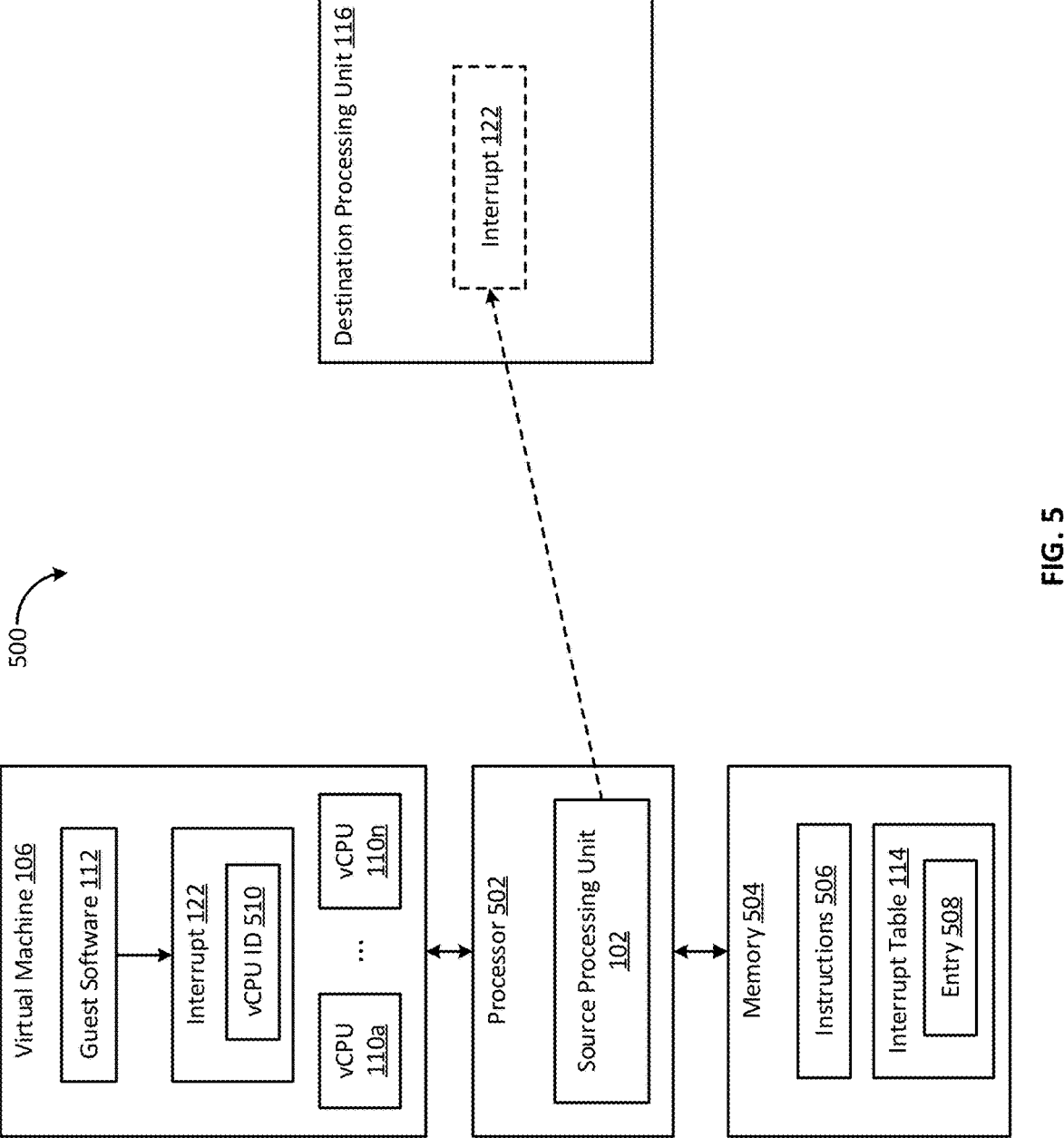
FIG. 5 shows a block diagram of an example of a system for transmitting interrupts from a virtual machine to a destination processing unit without triggering a VM exit according to some aspects of the present disclosure.

Another example of a system 500 is shown in FIG. 5. The system 500 includes a processor 502 communicatively coupled to a memory 504. The processor 502 and memory 504 are both hardware that can be integrated into a single computing device or can be distributed from one another.

The processor 502 is hardware that can include one processing device or multiple processing devices. Examples of the processor 502 include a Field-Programmable Gate Array (FPGA), an application-specific integrated circuit (ASIC), and a microprocessor. The processor 502 can execute instructions 506 stored in the memory 504 to perform one or more operations. In some examples, the instructions 506 can include processor-specific instructions generated by a compiler or an interpreter from code written in any suitable computer-programming language, such as C, C++, C#, and Java.

In some examples, the processor 502 can include a source processing unit 102. For example, the processor 502 may be the source processing unit 102 (e.g., if the source processing unit 102 is a physical processor 502). Alternatively, the source processing unit 102 may be a virtual processor executing on the physical processor 502. The source processing unit 102 can be configured to execute guest software 112 within a virtual machine 106.

The memory 504 can include one memory device or multiple memory devices. The memory 504 can be volatile or non-volatile (i.e., the memory 504 can retain stored information when powered off). Examples of the memory 504 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 502 with the instructions 506 or other program code. Examples of a computer-readable medium include magnetic disks, memory chips, ROM, random-access memory (RAM), an ASIC, a configured processor, optical storage, or any other medium from which a computer processor can read the instructions 506.

In some examples, the source processing unit 102 detect that the guest software 112 has transmitted an interrupt 122 to a virtual central processing unit (vCPU) identifier 522, wherein the vCPU identifier 522 does not match any vCPUs 110a-n in the virtual machine 106. In response to detecting that the guest software 112 has transmitted the interrupt 122, the source processing unit 102 can access an interrupt table 114 that is associated with the virtual machine 106. The interrupt table 114 includes an entry 508 that maps the interrupt 122 to a destination processing unit 116. The source processing unit 102 can determine that the interrupt 122 is to be transmitted to the destination processing unit 116 based on the entry 508 in the interrupt table 114. The source processing unit 102 can then transmit the interrupt 122 to the destination processing unit 116 without triggering an exit of the virtual machine 106 on the source processing unit 102. An interrupt handler 118 of the destination processing unit 116 can be configured to execute an interrupt procedure 124 corresponding to the interrupt 122. For example, the interrupt handler 118 may resolve a request associated with the interrupt 122 from the guest software 112.

FIG. 6 shows a flowchart of an example of a process for transmitting interrupts from a virtual machine to a destination processing unit without triggering a VM exit according to some aspects of the present disclosure. Other examples may include more operations, fewer operations, different operations, or a different order of operations than is shown in FIG. 6. The operations of FIG. 6 are described below with reference to the components of FIGS. 1 and 5 described above.

In block 602, the source processing unit 102 detects that guest software 112 of a virtual machine 106 has transmitted an interrupt 122 to a virtual central processing unit (vCPU) identifier 522 that does not match any vCPUs 110a-n of the virtual machine 106. For example, each of the vCPUs 110a-n may be assigned a corresponding vCPU identifier that is unique to that vCPU. The hypervisor may perform this assignment of vCPU identifiers to vCPUs 110a-n. But, the interrupt 122 may include the vCPU identifier 522 that does not correspond to any of the vCPU identifiers assigned to any of the vCPUs 110a-n of the virtual machine 106.

In block 604, the source processing unit 102 accesses an interrupt table 114 that is associated with the virtual machine 106. The source processing unit 102 can access the interrupt table 114 in response to detecting that the guest software 112 has transmitted the interrupt 122. The interrupt table 114 can include an entry 508 that maps an interrupt 122 to a destination processing unit 116. The entry 508 may have previously been incorporated into the interrupt table 114 by a hypervisor managing the virtual machine 106.

In block 606, the source processing unit 102 determines that the interrupt 122 is to be transmitted to the destination processing unit 116 based on the entry 508 in the interrupt table 114.

In block 608, the source processing unit 102 transmits the interrupt 122 to the destination processing unit 116, without triggering an exit of the virtual machine 106 on the source processing unit 102. For example, the source processing unit 102 can transmit the interrupt 122 to the destination processing unit 116 along an interrupt bus. An interrupt handler 118 of the destination processing unit 116 can be configured to execute an interrupt procedure 124 corresponding to the interrupt 122. The interrupt procedure 124 can be executed outside the context of the virtual machine 106.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A method comprising:
transmitting, by guest software of a virtual machine running on a source processing unit, an interrupt that includes an identifier of a destination virtual central processing unit (vCPU), wherein the identifier of the destination vCPU does not match any vCPUs in the virtual machine;
detecting, by the source processing unit, that the guest software has transmitted the interrupt; and
in response to detecting that the guest software has transmitted the interrupt:
accessing, by the source processing unit, an interrupt table that is associated with the virtual machine, wherein the interrupt table includes an entry that maps the interrupt to a destination processing unit;
determining, by the source processing unit, that the interrupt is to be transmitted to the destination processing unit based on the entry in the interrupt table; and
transmitting, by the source processing unit, the interrupt to the destination processing unit without triggering an exit of the virtual machine on the source processing unit.

2. The method of claim 1, wherein the source processing unit and the destination processing unit are physical processors of one or more physical machines.

3. The method of claim 1, wherein the source processing unit is a physical processor and the destination processing unit is a virtual processor.

4. The method of claim 1, wherein the interrupt table is a posted interrupt descriptor (PID) table.

5. The method of claim 1, wherein the destination processing unit is the same as the source processing unit.

6. The method of claim 1, wherein the interrupt is an inter-processor interrupt (IPI).

7. The method of claim 1, further comprising:
configuring, by a hypervisor executing on the source processing unit, the interrupt table to include the entry, wherein the entry includes the identifier of the destination vCPU, an interrupt number corresponding to the interrupt, and a pointer to the destination processing unit; and
determining, by the source processing unit, that the interrupt is to be transmitted to the destination processing unit based on the pointer in the entry of the interrupt table.

8. A system comprising:
a processor associated with a source processing unit, the source processing unit being configured to execute guest software within a virtual machine; and
a memory including instructions that are executable for causing the source processing unit to:
detect that the guest software has transmitted an interrupt that includes an identifier of a destination virtual central processing unit (vCPU), wherein the identifier of the destination vCPU does not match any vCPUs in the virtual machine; and
in response to detecting that the guest software has transmitted the interrupt:
access an interrupt table that is associated with the virtual machine, wherein the interrupt table includes an entry that maps the interrupt to a destination processing unit;
determine that the interrupt is to be transmitted to the destination processing unit based on the entry in the interrupt table; and
transmit the interrupt to the destination processing unit without triggering an exit of the virtual machine on the source processing unit.

9. The system of claim 8, wherein the source processing unit and the destination processing unit are physical processors of one or more physical machines.

10. The system of claim 8, wherein the source processing unit is a physical processor and the destination processing unit is a virtual processor.

11. The system of claim 8, wherein the interrupt table is a posted interrupt descriptor (PID) table.

12. The system of claim 8, wherein the destination processing unit is different than the source processing unit.

13. The system of claim 8, wherein an interrupt handler of the destination processing unit is configured to execute an interrupt procedure corresponding to the interrupt outside a context of the virtual machine.

14. The system of claim 8, wherein the guest software is configured to:
detect a need to transmit a request to the source processing unit; and
generate the interrupt in response to detecting the need to transmit the request to the source processing unit, and wherein an interrupt handler on the destination processing unit is configured to fulfill the request.

15. The system of claim 8, further comprising a hypervisor associated with the virtual machine, the hypervisor being configured to add the entry to the interrupt table, wherein the entry includes the identifier of the destination vCPU, an interrupt number corresponding to the interrupt, and a pointer to the destination processing unit.

16. The system of claim 8, wherein the destination processing unit is configured to:
access another interrupt table in response to receiving the interrupt, the other interrupt table including a plurality of entries that correlate a plurality of interrupts to a plurality of interrupt handlers, the plurality of entries including an entry that correlates the interrupt to a particular interrupt handler;
select the particular interrupt handler, from among the plurality of interrupt handlers, based on the entry in the other interrupt table; and
based on selecting the particular interrupt handler from among the plurality of interrupt handlers, transmit the interrupt to the particular interrupt handler, the particular interrupt handler being configured to execute an interrupt procedure corresponding to the interrupt.

17. The system of claim 8, wherein the interrupt table correlates the interrupt to a memory address associated with the destination processing unit, and wherein the memory further includes instructions that are executable for causing the source processing unit to:
determine the memory address corresponding to the interrupt based on the interrupt table; and
write interrupt data to the memory address, wherein an interrupt handler of the destination processing unit is configured to perform an interrupt procedure based on the interrupt data stored at the memory address.

18. A non-transitory computer-readable medium comprising program code that is executable by a source processing unit for causing the source processing unit to:

detect that guest software of a virtual machine has transmitted an interrupt having an identifier of a destination virtual central processing unit (vCPU) that does not match any vCPUs in the virtual machine; and in response to detecting that the identifier of the destination vCPU does not match any of the vCPUs in the virtual machine:

access an interrupt table that is associated with the virtual machine, wherein the interrupt table includes an entry that maps the interrupt to a destination processing unit;

determine that the interrupt is to be transmitted to the destination processing unit based on the entry in the interrupt table; and transmit the interrupt to the destination processing unit without triggering an exit of the virtual machine on the source processing unit.

19. The non-transitory computer-readable medium of claim 18, wherein the destination processing unit is a virtual processor.

20. The non-transitory computer-readable medium of claim 19, wherein the interrupt table is a posted interrupt descriptor (PID) table, and wherein the interrupt is an inter-processor interrupt (IPI).

\* \* \* \* \*